United States Patent
Lienhart et al.

(10) Patent No.: US 7,266,713 B2
(45) Date of Patent: Sep. 4, 2007

(54) APPARATUS AND METHOD FOR ADAPTATION OF TIME SYNCHRONIZATION OF A PLURALITY OF MULTIMEDIA STREAMS

(75) Inventors: Rainer W. Lienhart, Santa Clara, CA (US); Igor V. Kozintsev, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 620 days.

(21) Appl. No.: 10/754,977

(22) Filed: Jan. 9, 2004

(65) Prior Publication Data

US 2005/0166079 A1     Jul. 28, 2005

(51) Int. Cl.
*G06F 1/00*     (2006.01)
*H04L 7/00*     (2006.01)

(52) U.S. Cl. .................................... 713/500; 713/400
(58) Field of Classification Search .................... None
See application file for complete search history.

(56) References Cited

U.S. PATENT DOCUMENTS

| | | | |
|---|---|---|---|
| 4,021,784 A | 5/1977 | Kimlinger | |
| 5,689,689 A | 11/1997 | Meyers et al. | |
| 5,697,051 A | 12/1997 | Fawcett | |
| 5,794,019 A | 8/1998 | Genduso et al. | |
| 5,974,056 A | 10/1999 | Wilson et al. | |
| 6,009,236 A | 12/1999 | Mishima et al. | |
| 6,028,853 A | 2/2000 | Haartsen | |
| 6,138,245 A | 10/2000 | Son et al. | |
| 6,188,703 B1* | 2/2001 | Dobson et al. | 370/537 |
| 6,229,479 B1 | 5/2001 | Kozlov et al. | |
| 6,246,325 B1 | 6/2001 | Chittipeddi | |
| 6,279,058 B1* | 8/2001 | Gulick | 710/58 |
| 6,347,084 B1 | 2/2002 | Hulyalkar et al. | |
| 6,351,235 B1 | 2/2002 | Stilp | |
| 6,359,985 B1* | 3/2002 | Koch et al. | 380/54 |
| 6,381,402 B1* | 4/2002 | Sugita et al. | 386/94 |
| 6,490,256 B1 | 12/2002 | Jones et al. | |
| 6,640,253 B2 | 10/2003 | Schaefer | |
| 6,714,611 B1 | 3/2004 | Du et al. | |
| 6,735,630 B1 | 5/2004 | Gelvin et al. | |
| 6,870,503 B2 | 3/2005 | Mohamadi | |
| 6,882,309 B2 | 4/2005 | Bromley et al. | |
| 6,904,536 B2 | 6/2005 | Hasegawa | |
| 6,906,741 B2 | 6/2005 | Canova, Jr. et al. | |
| 6,937,680 B2 | 8/2005 | Fong et al. | |
| 6,965,590 B1 | 11/2005 | Schmidl et al. | |
| 7,030,812 B2 | 4/2006 | Bekritsky et al. | |

(Continued)

*Primary Examiner*—Rehana Perveen
*Assistant Examiner*—Mohammed Rehman
(74) *Attorney, Agent, or Firm*—Blakely, Sokoloff, Taylor & Zafman LLP

(57) ABSTRACT

A system and method for adaptation of time synchronization of a plurality of multimedia streams is presented. In one embodiment, multimedia data is captured, via a plurality of multimedia platforms. A first synchronization signal is received by each of the plurality of multimedia platforms. The first synchronization signal is used to generate a first common clock reference among the plurality of multimedia platforms. Captured multimedia data is synchronized according to the first common clock reference. A second synchronization signal is received by each of the plurality of multimedia platforms. The second synchronization signal is used generate a transitional common clock reference among the plurality of multimedia platforms. The second synchronization signal is also used to generate a second common clock reference among the plurality of multimedia platforms.

18 Claims, 9 Drawing Sheets

U.S. PATENT DOCUMENTS

| | | |
|---|---|---|
| 2001/0056501 A1 | 12/2001 | Law et al. |
| 2002/0018458 A1 | 2/2002 | Aiello et al. |
| 2002/0059535 A1* | 5/2002 | Bekritsky et al. ........... 713/400 |
| 2002/0064134 A1 | 5/2002 | Lee et al. |
| 2002/0069299 A1 | 6/2002 | Rosener et al. |
| 2002/0114303 A1 | 8/2002 | Crosbie et al. |
| 2003/0069025 A1 | 4/2003 | Hoctor et al. |
| 2003/0172179 A1 | 9/2003 | del Prado Pavon et al. |
| 2004/0125822 A1 | 7/2004 | Jun et al. |
| 2005/0001742 A1 | 1/2005 | Small |
| 2005/0166079 A1* | 7/2005 | Lienhart et al. ............ 713/500 |
| 2005/0228902 A1* | 10/2005 | Lienhart et al. ............ 709/248 |

* cited by examiner

APPARATUS AND METHOD FOR ADAPTATION OF TIME SYNCHRONIZATION OF A PLURALITY OF MULTIMEDIA STREAMS

FIELD OF THE INVENTION

This application is related to U.S. Pat. No. 7,197,658, entitled "Method and System for Synchronizing Multimedia I/O with CPU Clock", issued on Mar. 27, 2007, and the application is related to application Ser. No. 10/749,989, entitled "Method and System for Synchronizing Platform Clocks In A Distributed Wireless Platform", filed on Dec. 31, 2003, which applications are assigned to the assignee of the present application.

One or more embodiments of the invention relate generally to the field of distributed multimedia platform synchronization. More particularly, one or more of the embodiments of the invention relates to a method and apparatus for time synchronization of a plurality of multimedia streams.

BACKGROUND OF THE INVENTION

Distributed computer environments attempt to harness the power of several computers in order to perform desired processing tasks. Oftentimes, this usage model enables several computers to collaboratively perform computationally intensive tasks within substantially reduced amounts of time. Generally, the divide and conquer approach provided by parallel computing enables utilization of available personal computers, rather than purchasing of a high performance, server-based computer system for performing the computationally intensive tasks.

Until recently, the only collaborative usage model for multiple personal computers (PCs) was based on distributing purely computational tasks. As such, distributed computing has generally not been applied to synchronized capture and/or processing of signals, especially audio/video signals (and data streams). In general, signal processing of audio and video signals (multimedia data) is very sensitive to time jitters, delays and drifts. As a result, signal processing for such multimedia data requires precise synchronization for high quality input/output processing, as well as robustness and reliability issues.

Unfortunately, precise capture and synchronization of inputs as well as precise rendering and synchronization of outputs is not guaranteed on current platforms. As a result, new usage paradigms for PCs, personal digital assistants (PDAs), Tablets and the like, as devices for collaborative signal processing of multimedia signals are generally not available. For example, signal processing on a common PC platform can lead to several problems when several I/O devices are used to capture audio and visual information utilizing, for example, video cameras and microphones.

As such, various problems arise due to the fact that different I/O devices will be triggered by separate oscillations. Unfortunately, the separate oscillations cause resulting audio samples and video frames to be unaligned along an absolute timeline, thereby inducing some relative offsets. Moreover, due to differences in oscillator frequencies, audio and visual data will drift away across multiple channels and streams over time. Likewise, multimedia signal processing within multiple PC platforms can lead to several problems.

Within multiple PC platforms, audio and visual I/O devices will not be synchronized in time scale, which will cause data samples to drift and/or be shifted relative to each other. The extent of the shift, jitter and/or drift on the existing platforms depends on hardware and software parameters and can be very significant, sometimes causing total degradation of the processed signals from the non-synchronized input streams. Such drifts, delays and/or jitters can cause significant performance degradation for, for instance, array signal processing algorithms.

For example, in an acoustic beam former with 10 centimeter (cm) spacing between microphones, an error of only 0.01 percent in time can cause error of 20 degrees in the beam direction. Due to this fact, current implementations of audio array process algorithms rely on dedicated circuitry for the synchronization between multiple I/O channels. Unfortunately, implementing such an approach with existing PC platforms would require a major overhaul of the current hardware utilized by the PC platforms. Therefore, there remains a need to overcome one or more of the limitations in the above-described, existing art.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
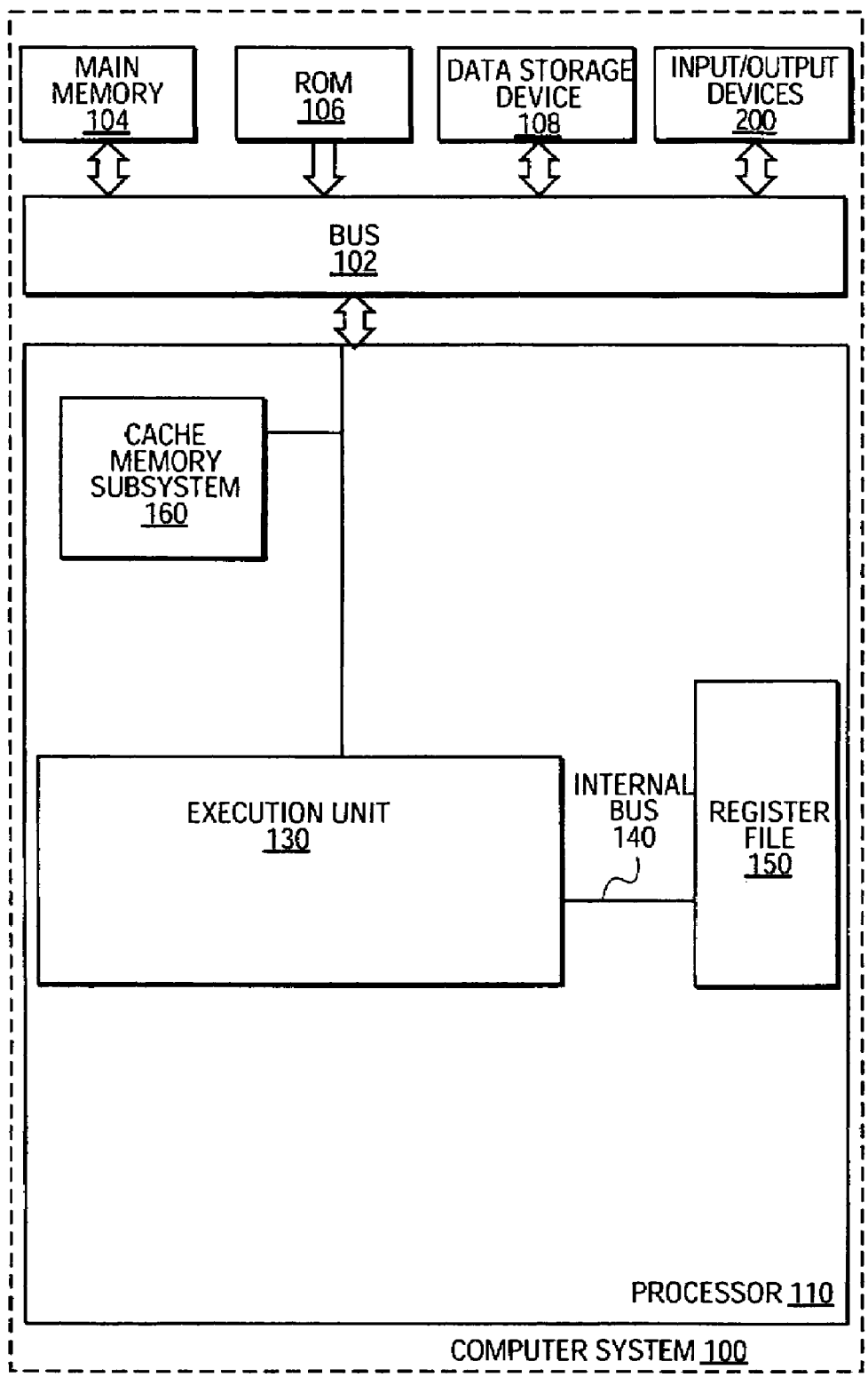
FIG. 1 depicts a block diagram illustrating a computer system as known in the art in which one embodiment of the present invention may be implemented.

A method and apparatus for time synchronization of a plurality of multimedia streams are described. In one embodiment, the method includes the concurrent capture of multimedia data via a plurality of multimedia platforms. During the concurrent capture of the multimedia data, each of the multimedia platforms receives a synchronization signal from a synchronization generator and distributes it to one or more media capture cards. In response, each platform processes one or more received synchronization signals to generate a common reference clock signal among each of the platforms and their capture devices. Once the common clock signal is generated, each of the platforms processes the captured multimedia data to form multimedia data streams according to the common reference clock signal. As such, the plurality of multimedia platforms are able to perform collaborative signal processing of multimedia streams, including, for example, array signal processing algorithms.

In the following description, for the purposes of explanation, numerous specific details are set forth in order to provide a thorough understanding of the embodiments of the present invention. It will be apparent, however, to one skilled in the art that the various embodiments of the present invention may be practiced without some of these specific details. In addition, the following description provides examples, and the accompanying drawings show various examples for the purposes of illustration. However, these examples should not be construed in a limiting sense as they are merely intended to provide examples of the embodiments of the present invention rather than to provide an exhaustive list of all possible implementations of the embodiments of the present invention. In other instances, well-known structures and devices are shown in block diagram form in order to avoid obscuring the details of the various embodiments of the present invention.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression.

In an embodiment, the methods of the various embodiments of the present invention are embodied in machine-executable instructions. The instructions can be used to cause a general-purpose or special-purpose processor that is programmed with the instructions to perform the methods of the embodiments of the present invention. Alternatively, the methods of the embodiments of the present invention might be performed by specific hardware components that contain hardwired logic for performing the methods, or by any combination of programmed computer components and custom hardware components.

In one embodiment, the present invention may be provided as a computer program product which may include a machine or computer-readable medium having stored thereon instructions which may be used to program a computer (or other electronic devices) to perform a process according to one embodiment of the present invention. The computer-readable medium may include, but is not limited to, floppy diskettes, optical disks, Compact Discs (CD/DVD-ROMs/RWs/Rs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

System Architecture

FIG. 1 shows a computer system 100 upon which one embodiment of the present invention can be implemented. Computer system 100 comprises a bus 102 for communicating information, and processor 110 coupled to bus 102 for processing information. The computer system 100 also includes a system memory subsystem 104-108 coupled to bus 102 for storing information and instructions for processor 110. Processor 110 includes an execution unit 130, a register file 150 and a cache memory subsystem 160.

The cache subsystem may include high speed, temporary memory buffers (cache) that are coupled to execution unit 130 and store frequently and/or recently used information for processor 110. As described herein, memory buffers, include but are not limited to cache memories, solid state memories, RAM, synchronous RAM (SRAM), synchronous data RAM (SDRAM) or any device capable of supporting high speed buffering of data. Accordingly, high speed, temporary memory buffers are referred to interchangeably as cache memories or one or more memory buffers.

Figure 2:
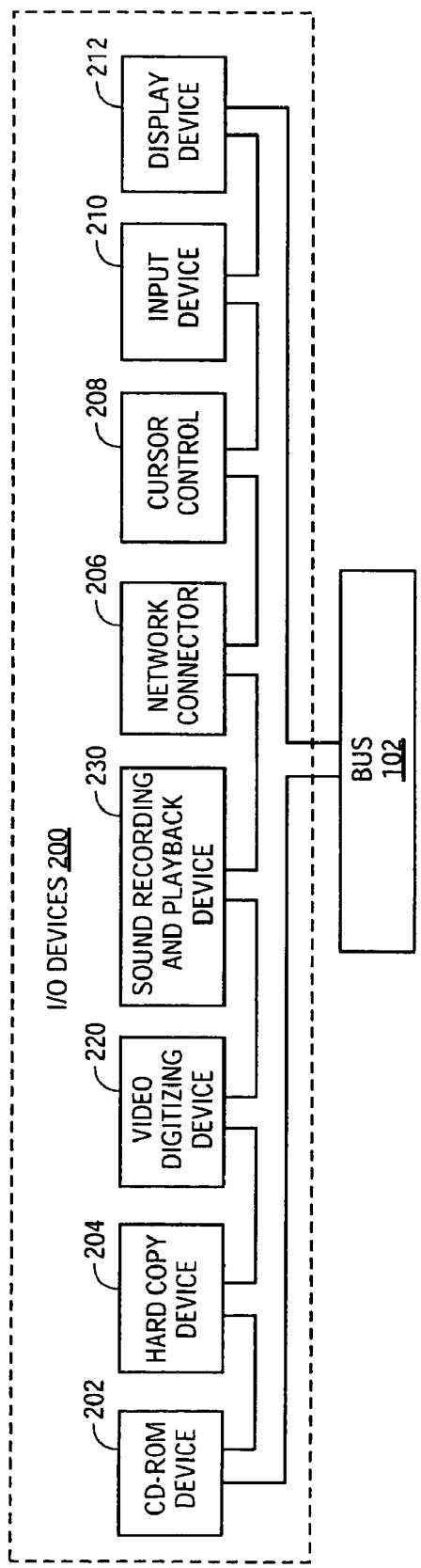
FIG. 2 depicts a block diagram further illustrating input/output devices of computer system, as depicted in FIG. 1.

FIG. 2 further illustrates input/output (I/O) devices 200 of computer system 100 as depicted in FIG. 1. As illustrated, the computer system 100 may include a display device 212 such as a monitor. The display device 212 may include an intermediate device such as a frame buffer. Computer system 100 also includes an input device 210 such as a keyboard and a cursor control 208 such as a mouse, or trackball, or track pad. The display device 212, the input device 210, and the cursor control 208 are coupled to bus 102. Computer system 100 may include a network connector 206 so that computer system 100 may be connected as part as a local area network (LAN) or a wide area network (WAN) such as, for example, the Internet.

Additionally, computer system 100 can also be coupled to a device for sound recording and playback 230 such as an audio digitization device coupled to a microphone for recording voice input for speech recognition or for recording sound in general. Input/output devices 200 of computer system 100 may also include a video digitizing device 220 that can be used to capture video images in conjunction with sound recording device 230 to capture audio information associated with the video images. Finally, the input devices 200 may also include a hard copy device 204 such as a printer and a CD-ROM device 202. The input devices 200 (202-212) are also coupled to bus 102.

As such, computer system 100 as depicted in FIG. 1 may be utilized to capture multimedia data including, for example, audio and video data from a selected scene, environment, or the like. Currently, many individuals utilize personal computers (PCs) such as depicted in FIG. 1 in order to capture live audio/video data (multimedia scene data) through, for example, a camera coupled to a port of computer system 100 (not shown) such as, for example, a universal serial bus (USB) port. This data is then generated into a streaming media format (Multimedia Stream Data) including, but not limited to, Microsoft® advanced steaming format (ASF) files, motion picture experts group (MPEG) standards such as MPEG-1/2/4, and audio layer-3 (MP3) files, Real Audio G2 files, QDesign2 files, or the like.

Likewise, an audio capture device such as, for example, a microphone may be utilized by computer system 100 to capture audio information associated with the captured multimedia scene data. Accordingly, as individuals attempt to utilize their personal computers in order to capture, for example, live audio/video data, it is generally recognized that audio/video data is most effectively captured utilizing one or more data capture devices. Moreover, a current emphasis in current design technology is parallel computing.

Parallel computing espouses the use of distributed computer environments which attempt to harness the power of several computers in order to perform desired processing tasks. In other words, various individuals have recognized that the processing power available from a multitude of computers owned by businesses and corporations, or the like, may possibly be put to use in order to provide some benefit to companies, individuals, or the like. As such, these usage models enable several computers to collaboratively perform computationally intensive tasks within substantially reduced amounts of time.

Figure 3:
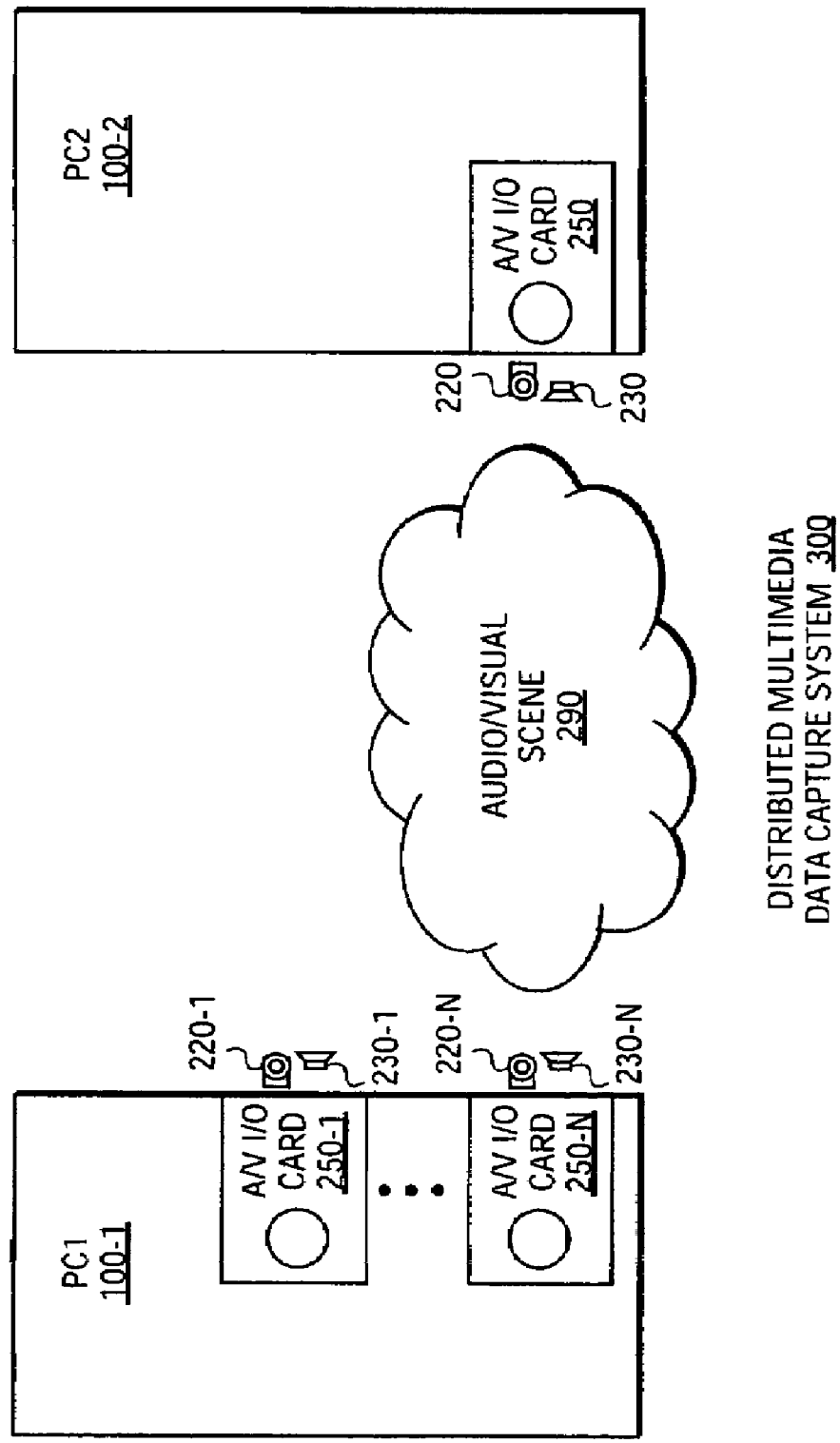
FIG. 3 depicts a block diagram illustrating a distributed multimedia data capture system, in accordance with one embodiment of the present invention.

Generally the divide and conquer approach provided by parallel computing enables utilization of available personal computers rather than purchasing of a high performance, server based system for performing computationally intensive tasks. Until recently, the only collaborative usage model for personal computers was based on distributing computing for purely computational tasks. As such, distributed computing has generally not been applied to distributed signal capturing and processing, and especially not to distributed capturing and processing of live audio/video signals (multimedia scene data). However, one embodiment of the present invention is directed toward a distributed multimedia data capture system, for example, data capturing system 300 as depicted in FIG. 3.

Unfortunately, signal processing of audio and video signals (multimedia scene data) is very sensitive to time jitters, delays and drifts. For example, referring again to data capture system 300, as depicted in FIG. 3, the multimedia platform 100 includes a plurality of audio and/or audio/video (A/V) I/O (capture) cards 250 (250-1, . . . , 250-N) as illustrated, each I/O card 250 includes a video capture device 220 and/or an audio capture device 230. However, if a first PC (PC1) 100-1 is used to capture audio/visual scene 290 several problems may arise between the multimedia data streams generated by the various I/O cards 250 of PC1 100-1. The problems arise due to the fact that different I/O devices are triggered by separate oscillators (which causes drifts), start to capture at different time instances (which causes relative delays), and exhibit jitter in their oscillators. Consequently, resulting audio samples as well as video frames will not be aligned on an absolute timeline thus inducing some relative offsets, jitters, and drifts.

Likewise, a second PC (PC2) 100-2 can be utilized in conjunction with PC1 100-1 in order to also capture the audio/visual scene data 290 as part of the distributed multimedia data capture system 300. Unfortunately, the I/O cards used to capture the audio/visual scene 290 will generate multimedia data streams that are not synchronized within a common time scale. As a result, data samples between the generated multimedia stream data will be shifted and tend to drift relative toward one another.

Current implementations of audio array processing algorithms rely on dedicated circuitry for tight synchronization (sync) between multiple I/O channels. However, for existing PC platforms, for example, distributed data capture system 300, as depicted in FIG. 3, the implementation of a distributed data capture system performing, for example, array signal processing requires a major overhaul of system hardware. For existing PC platforms, drift between multimedia data streams generated by, for example, distributed data capture system 300, as depicted in FIG. 3, can be quite significant.

Figure 4:
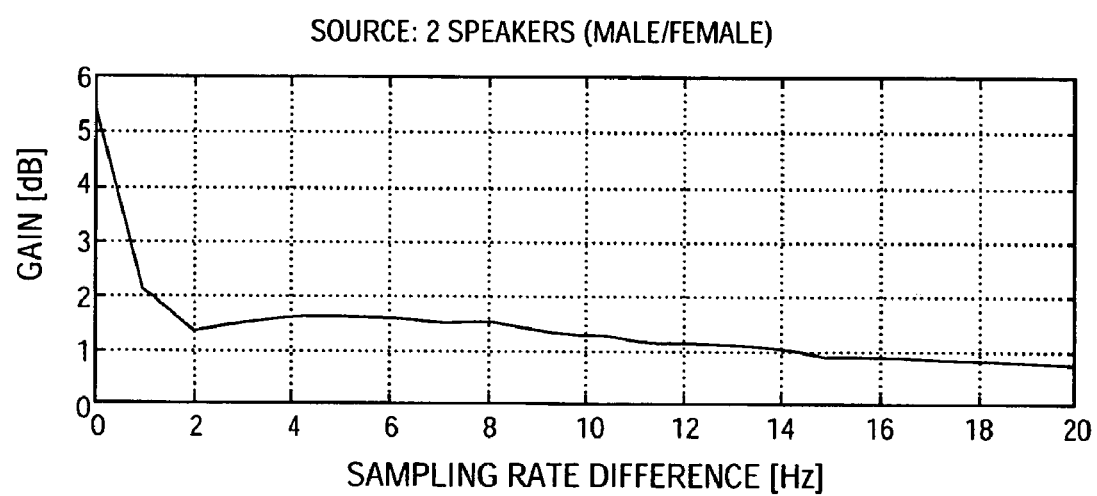
FIG. 4 depicts a graph illustrating the gain/loss in signal quality by applying BSS (Blind Source Separation) with respect to sampling rate differences between multimedia stream data captured by the multimedia capture system as depicted in FIG. 3.

FIG. 4 illustrates a graph depicting the impact of sampling rate differences on the gain in signal quality with BSS. For example, in a multi-speaker environment it is desirable to separate the audio signals that belong to different sources. An advanced array signal processing algorithm such as blind source separation (BSS) may be applied to perform joint processing of multiple captured audio signals to extract multiple speakers. In one embodiment, BSS was performed on an audio mix of two speakers using two microphones connected to two different PCs such as, for example, distributed data capture system 300, as depicted in FIG. 3.

As illustrated in FIG. 4, the quality of speaker separation (higher gain corresponds to better quality) decreases as a function of increased sampling frequency differences between audio sources. As illustrated even a 2-5 Hz sampling frequency drift (from 16000 Hz nominal frequency) causes significant degradation of the BSS performance (both in terms of dBs and the perceptually assessed quality). In other words, the smaller the sampling rate difference or drift, the higher the gain produced. Likewise as the sampling difference is increased, the gain dramatically drops below accepted levels.

Figure 5:
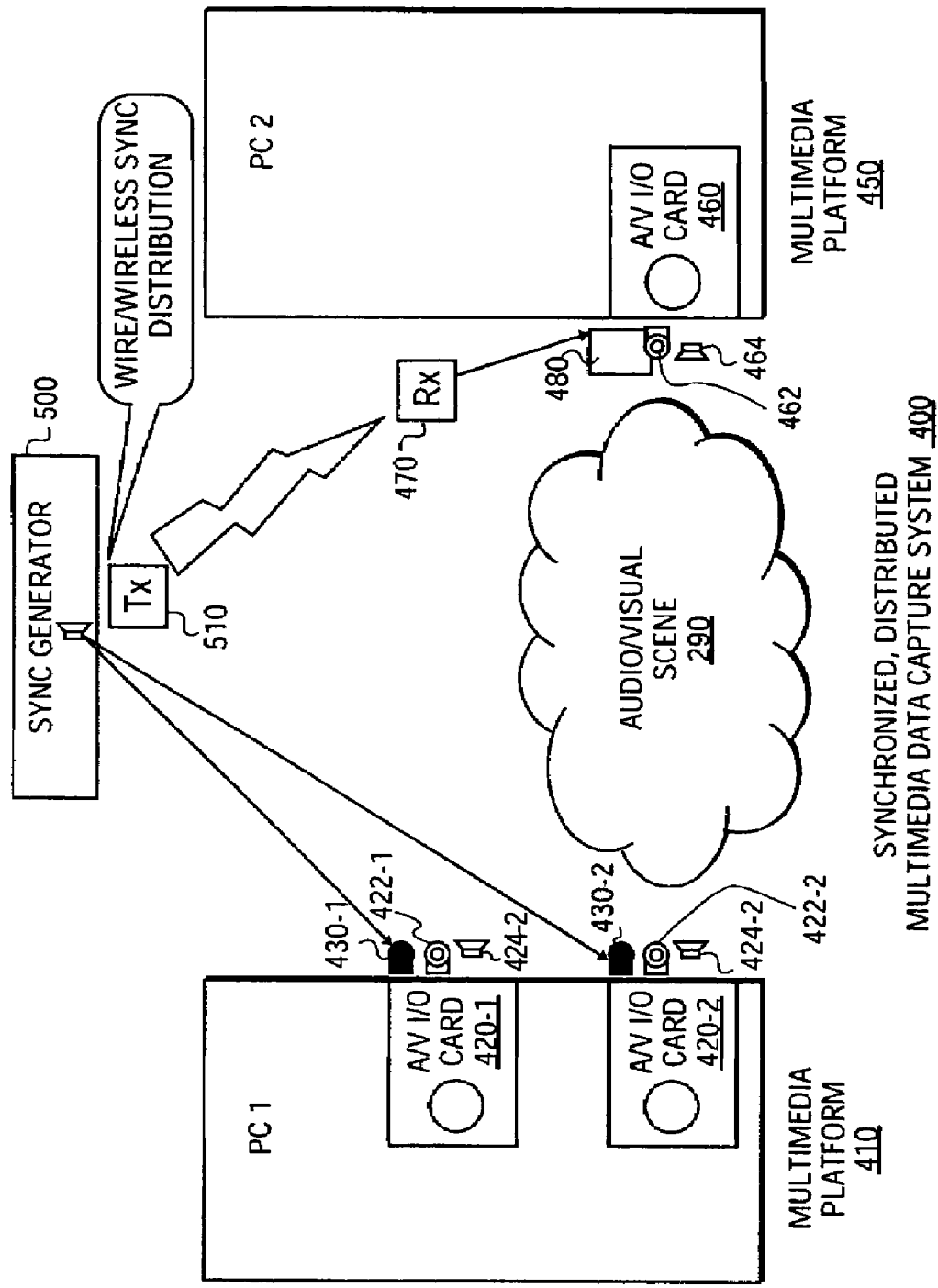
FIG. 5 depicts a synchronized distributed multimedia data capture system, in accordance with one embodiment of the present invention.

Accordingly, one embodiment of the present invention provides a synchronized, distributed multimedia data capture system 400, for example, as depicted with reference to FIG. 5. As illustrated in FIG. 5, the data capture system 400 may include a plurality of multimedia platforms. In the embodiment illustrated, multimedia platform 410, as well as multimedia platform 450 are provided. However, FIG. 5 should not be construed in a limiting sense and is provided to illustration one embodiment of the present invention.

In the embodiment depicted, multimedia platform 410, as well as multimedia platform 450 may be provided utilizing computer system 100, as depicted in FIG. 1. As illustrated, multimedia platform 410 includes a plurality of I/O cards 420, for example, as illustrated with reference to FIG. 3. However, in addition to having a microphone 424, as well as a video capture device 422, each audio/video card includes a wired link input 430 which is used to receive a multimedia synchronization signal, which is generated by sync generator 500.

In one embodiment, sync generator 500 is configured utilizing a computer system, such as computer system 100, as depicted in FIG. 1. In the embodiment illustrated sync generator 500 generates synchronization signal. In one embodiment, the synchronization signal is selected as a maximum length sequences (MLS) signal, which is generally comprised of white noise, to form an audio sync signal. However, in alternate embodiments, a multimedia synchronization signal may be selected if desired based on the specific implementation.

In the embodiment illustrated, the synchronization signal may be provided via a wired link, for example, to multimedia platform 410 and/or may be transmitted wireless via transmitter 510 and receiver 470 to multimedia platform 450. An example of a wireless transmitter 510 and receiver 470 is an RF-based transmitter and receiver. In one embodiment, a single multimedia synchronization signal is generated which is transmitted to each of the multimedia platforms via either a wired link or a wireless link. As such, multimedia platform 450 includes I/O card 460 with a video capture device 462, as well as an audio capture device 464.

However, in contrast to multimedia platform 410, multimedia platform 450 includes a wireless receiver (Rx) 470 which is used to capture the received multimedia synchronization signal. In one embodiment, the transmitter modulates the synchronization signal onto a multimedia signal, (e.g., audio signal), which in turn is modulated onto some wireless carrier signal and the receiver demodulates the received signal in order to generate the multimedia modulated synchronization signal. The multimedia modulated synchronization signal (i.e., the synchronization signal modulated onto a multimedia signal) is then provided to the video capture device(s) and/or audio capture device(s) in order enable synchronization of captured audio/visual scene data 290. In one embodiment, the wireless transmission of the synchronization signal may be provided using, for example, wireless audio transmission via a U.S. Robotics Sound Link Solution.

In accordance with one embodiment, an audio synchronization signal is generated as the multimedia synchronization signal. As such, the audio synchronization signal may be analyzed to determine a target sampling frequency and target start time. Based on the target start time, errors may be detected between captured audio stream data as compared to the received audio synchronization signal. For example, a relative delay may be calculated in accordance with Equation (1) to provide a positive or negative offset between captured audio stream data, as compared to the received audio synchronization signal.

Likewise, jitter may be calculated as a variance in audio samples between the audio synchronization signal and generated audio stream data. Finally, drift may be calculated in accordance with Equation 2 to provide a frequency offset between the audio synchronization signal and captured audio stream data. In an alternate embodiment, the synchronization signal could be provided utilizing 802.11a and 802.11b wireless standards to provide a target sampling rate signal. As such, the distributed data capture system 400 will determined a target sampling frequency, as well as errors between the received synchronization signal and the captured multimedia stream data.

Once errors are determined within generated multimedia stream data, each multimedia platform 410 is responsible, for example, for resampling of generated multimedia stream data to synchronize the multimedia stream data generated by each I/O card of each multimedia platform. Consequently, once all generated multimedia stream data is synchronized, the captured stream data may be provided to an array signal processing computer (not illustrated). The array signal processing computer may then perform, for example, beamforming, blind signal separation (BSS), multi-modal recognition, or the like, utilizing the synchronized multimedia stream data. Likewise, embodiments of the present invention may be performed within multimedia data capture system 400 using, for example, camcorders, video capture devices, or the like, which include multiple input channels.

As such, a wireless audio transmission device can convert an RF synchronization signal into a standard synchronization signal. Once converted, the synchronization signal is embedded into the captured multimedia data. Consequently, the synchronization signal is available to the application layer as a separate audio track, which can then be processed in order to synchronize captured multimedia data utilizing, for example, resampling. Accordingly, synchronization signals are formed within sync generator 500 which utilizes its own clock to modulate a carrier wave signal. The carrier wave signal can be chosen from many possible types. However, in one embodiment, maximum length sequences (MLS) are utilized due to their excellent auto-correlation characteristics.

As illustrated, the synchronization signals are delivered to the various devices via one of a wired link and a wireless link. For wireless distribution, a simple frequency modulated (FM) radio transmitter and receiver may be used to modulate/demodulate the synchronized signals. However, in one embodiment, formation of a synchronized distributed multimedia data capture system 400, for example, as depicted in FIG. 5, may require the measure of absolute latencies of individual transmitters and receivers for calibration.

Accordingly, the distribution of audio synchronization over dedicated links, rather than through the air, avoids propagation delay and enables synchronization of the various generated multimedia stream data. Therefore, an embodiment of the present invention may be implemented within conventional data capture devices provided the data capture device includes an additional audio input channel that is dedicated for time synchronization purposes. In addition, since the sync signals are sent via electromagnetic waves, propagation time can be neglected in most distributed computing environments. In another embodiment of the present invention the synchronization signal may be added as a watermark to the Multimedia input (audio/video) before capturing, thus not even requiring any additional input channel. During subsequent processing, the watermark encoding of the synchronization information can be extracted.

In contrast, current solutions for synchronization of multiple multimedia streams typically rely on a dedicated and proprietary wire link for distributing common clocks. The disadvantages of such an approach include the inability to handle situations where multimedia I/O hardware is physically located on separate platforms or in multiple environments (e.g., two audio capture devices located on different laptops or even within the same computing platform), but with no provision for common clock distribution (e.g., audio and video capture cards with no provision for the proprietary synchronization mechanism).

Accordingly, one embodiment of the present invention addresses both situations without requiring significant changes to hardware functionality. In one embodiment, a U.S. Robotics Audio Link Solution, or the like, provides wireless audio transmission.

Operation

Figure 6:
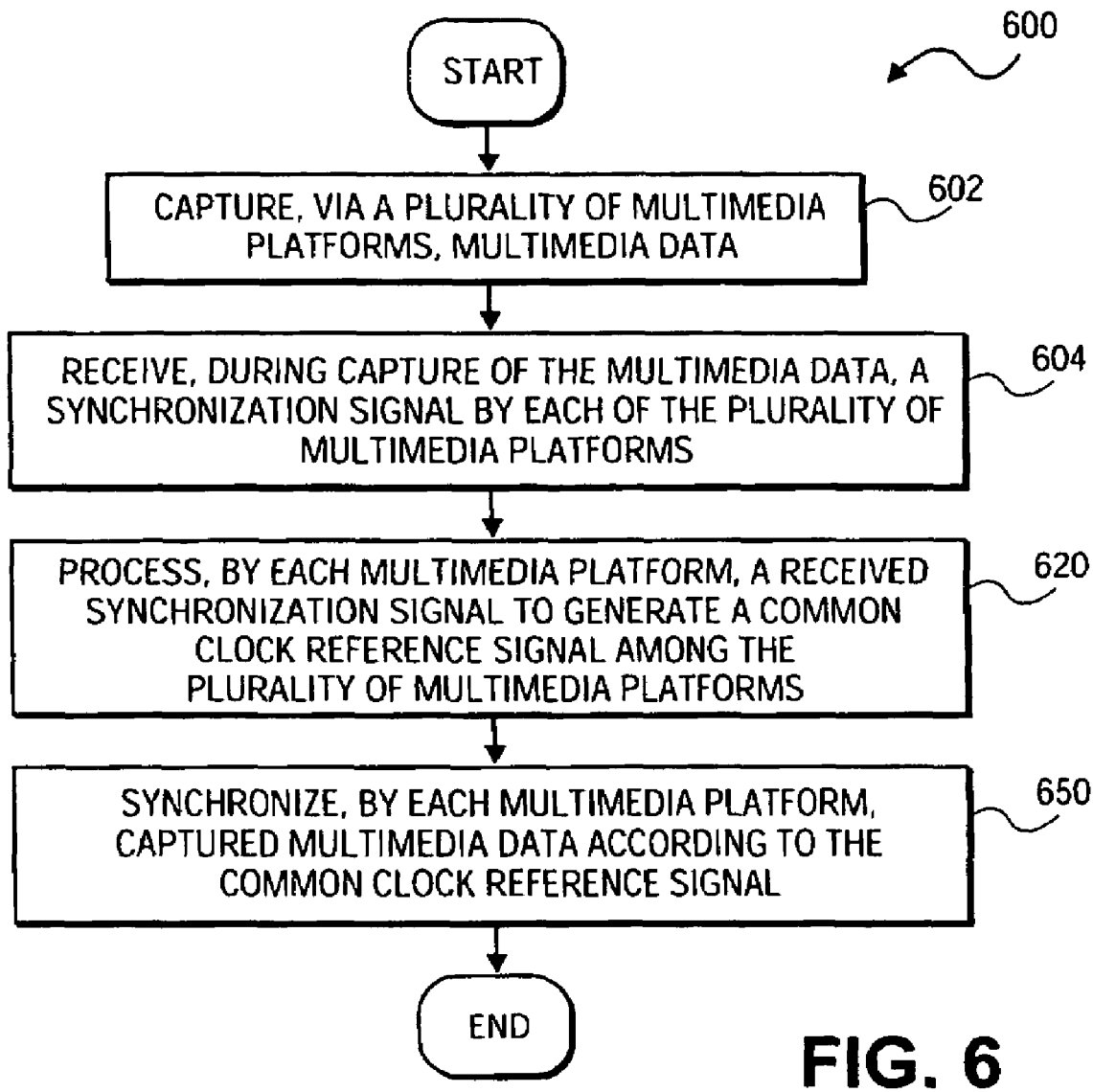
FIG. 6 depicts a flow chart illustrating a method for synchronization of a plurality of multimedia stream data, in accordance with one embodiment of the present invention.

FIG. 6 depicts a flow chart illustrating an embodiment of a method 600 for generating synchronized multimedia data streams within a plurality of platforms such as system 400, as depicted with reference to FIG. 5. At process block 602, multimedia data is captured via a variety of multimedia platforms. At process block 604 each multimedia platform receives a synchronization signal during capture of the multimedia data. Once the synchronization signal is received, each platform processes the received synchronization signal to generate a common clock reference signal among the plurality of platforms.

Finally, at process block 650 each platform synchronizes captured multimedia data according to the common clock reference signal. In an alternative embodiment, all of the captured multimedia data may be synchronized within one or more multimedia platforms. In one embodiment, the synchronization signal is received by each platform via one of a wired link and a wireless radio frequency (RF) link. For example, as illustrated with reference to FIG. 5, media platform 410 receives the synchronization signal via wired link 430, whereas multimedia platform 450 receives the synchronization signal via receiver 470. However, regardless of the source of the synchronization signal, each multimedia platform is able to either directly process the synchronization signal or demodulate the synchronization signal to detect desired synchronization data.

Each multimedia platform that has a synchronization signal present on one of the input channels can be synchronized with other multimedia platforms by performing sample time conversion (STC). In one embodiment, let t represent a local time with t=0, 1, 2 . . . representing sampling times at a multimedia platform's analog to digital (A/D) converter (in one embodiment, all channels of one input device are sampled synchronously within one platform.) Similarly, let y represent the global time at the audio sync generator with y=0, 1, 2 . . . sampling times in the audio sync generator digital to analog (D/A) converter. A piecewise linear model implies that y(t)=at+b with a and b being constants over adjacent time intervals. Therefore in order to perform STC from local clock t into global clock y, we simply lookup the parameters corresponding to the value of y and calculate t=(y−b)/a.

Figure 7:
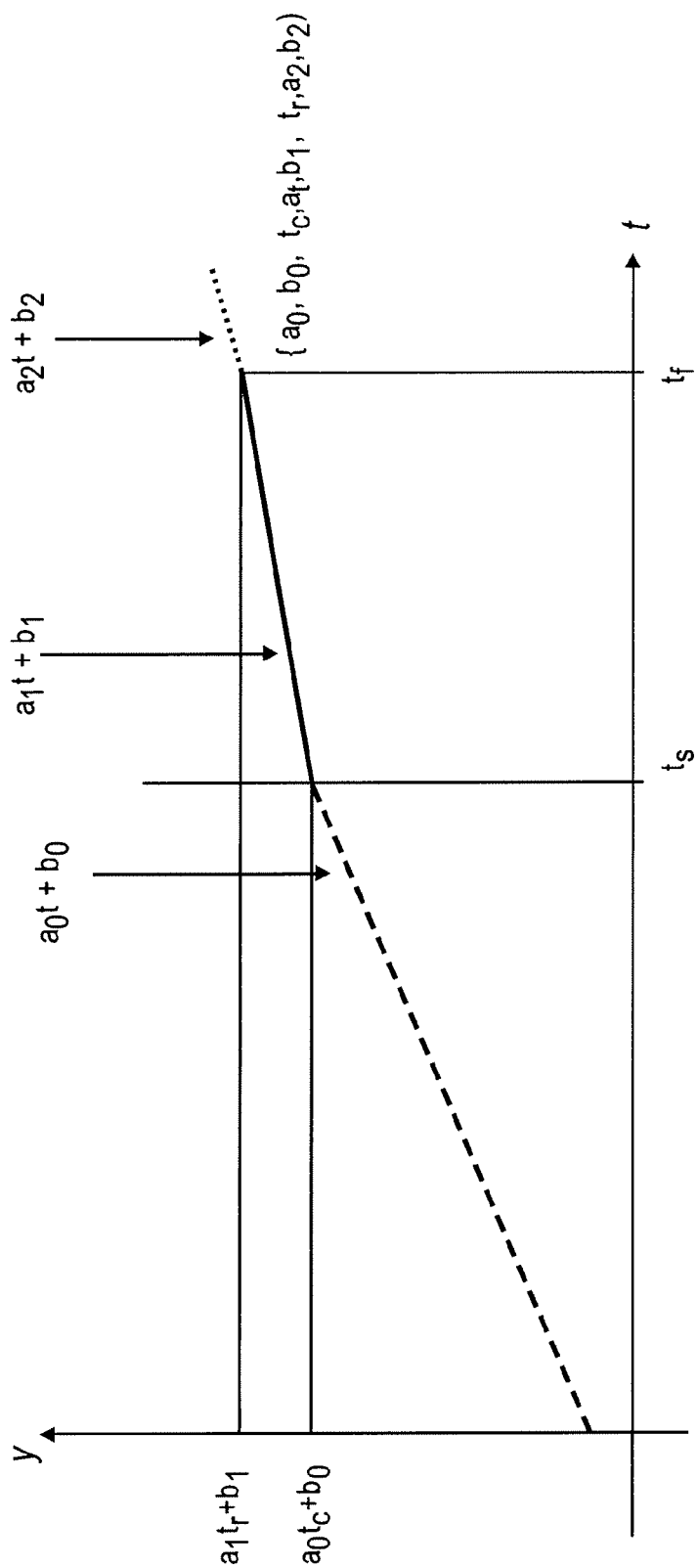
FIG. 7 illustrates a common clock references as generated via a piecewise linear model, in accordance with an embodiment of the present invention.

FIG. 7 illustrates common clock references as generated via the piecewise linear model with three linear regions for t: [inf, $t_s$], [$t_s$, $t_f$] and [$t_f$, inf] and their respective parameters ($a_0$, $b_0$), ($a_1$, $b_1$), and ($a_2$, $b_2$). In one embodiment, as illustrated, the piecewise linear model is monotonically increasing. In one embodiment, as illustrated, the piecewise linear model is continuously and monotonically increasing. The clock models illustrated in FIG. 7 are an example of mapping local time into global time. Other functions may be in alternative embodiments.

Figure 8:
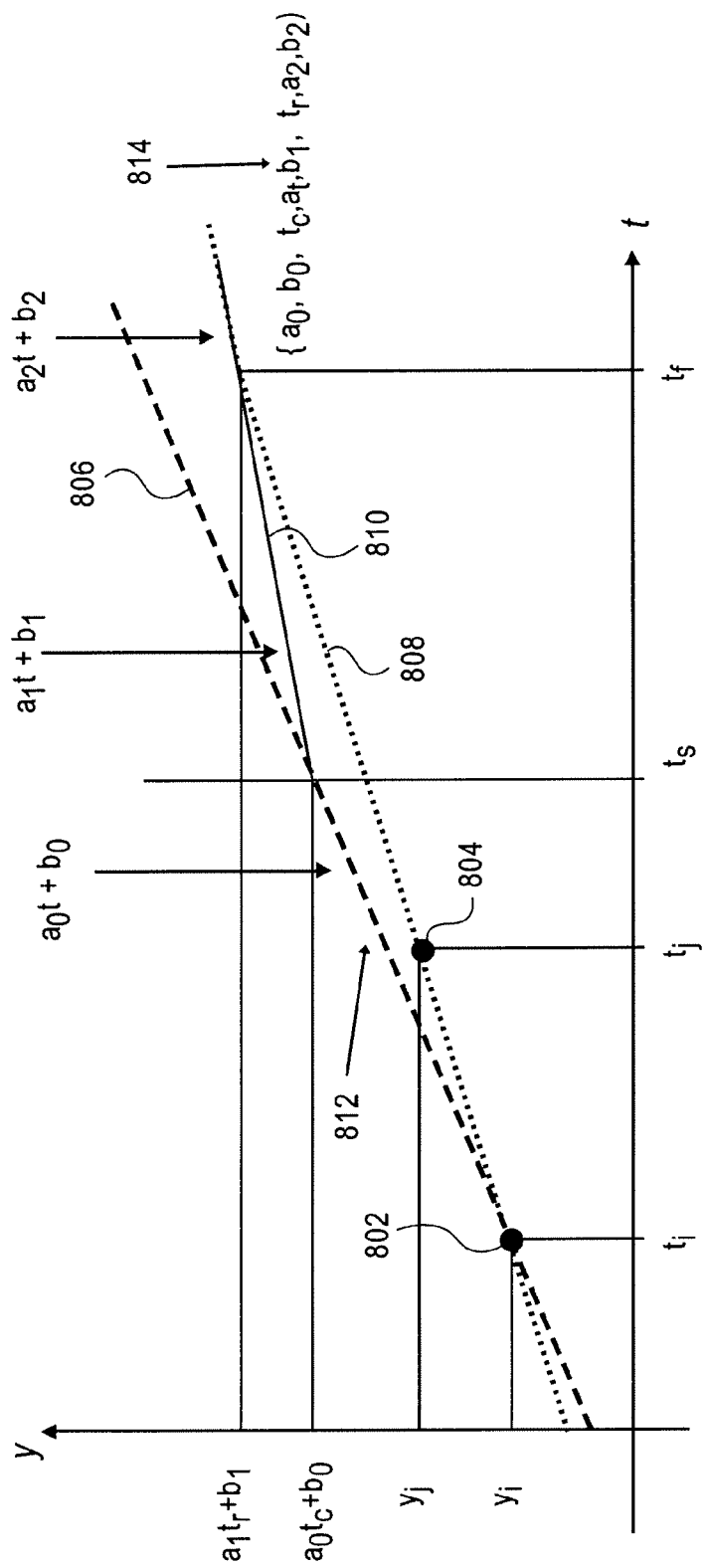
FIG. 8 illustrates a linear clock reference model showing an adaptation of a transformation from a first clock reference model to a second clock reference model, in accordance with one embodiment of the present invention.

FIG. 8 illustrates a linear clock reference model showing the adaptation of transformation from a first clock reference model 806 to a second clock reference model 808. In one embodiment, the piecewise linear STG model of FIG. 8 illustrates a first set of synchronization points defined as pairs (t,y) corresponding to some common event observable by the platforms that are being synchronized. In one embodiment, two such points ($t_i$, $y_i$) 802 and ($t_j$, $y_j$) 804 are illustrated in FIG. 8. In one embodiment, the synchronization points are used to update the three sets of (a,b) parameters in the model. In one embodiment, autocorrelation peaks of the synchronization signal are used as a common event to update the model.

Figure 9:
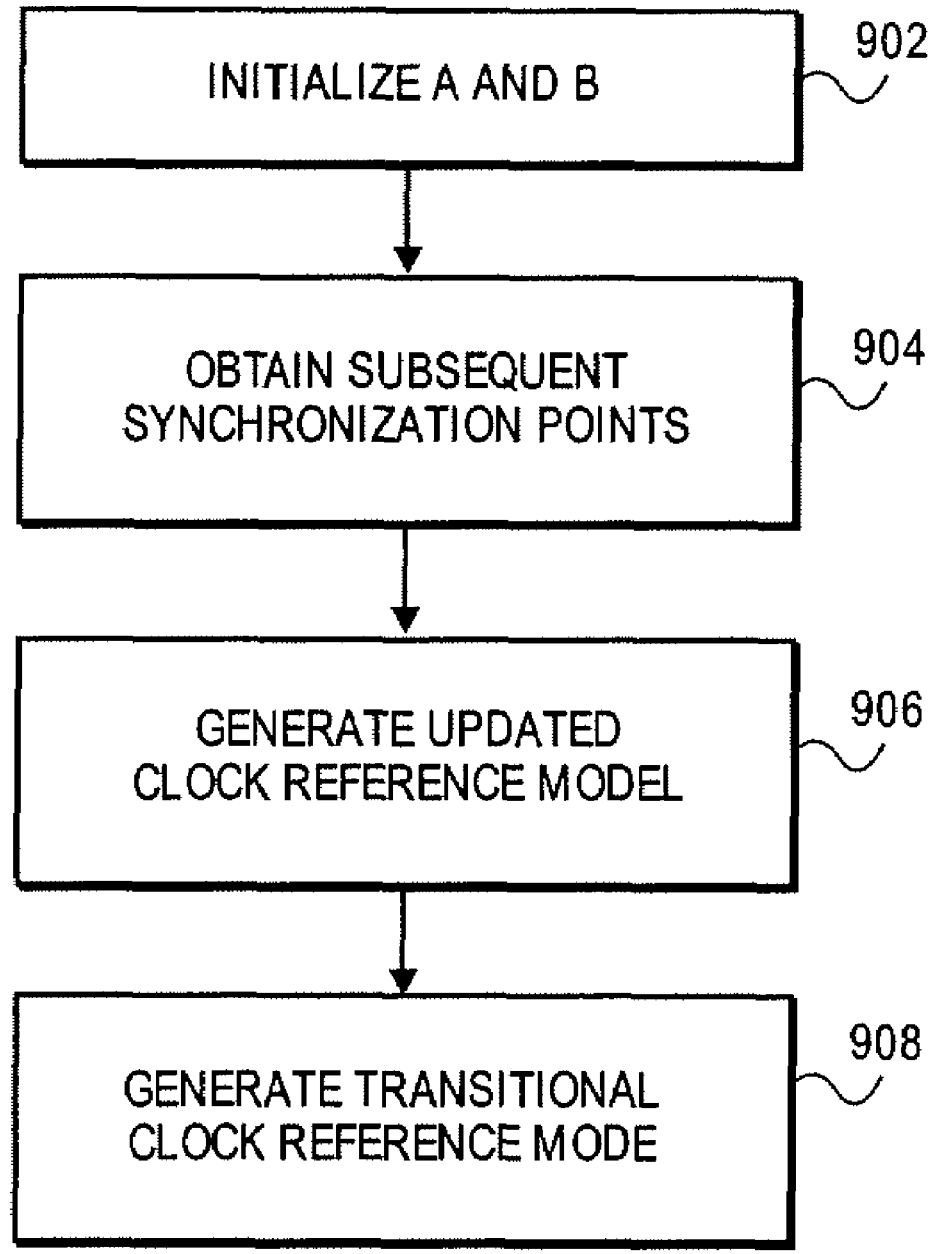
FIG. 9 presents a flow diagram describing the processes of the adaptation of transformation from a first clock reference model to a second clock reference model, in accordance with one embodiment of the present invention.

FIG. 9 presents a flow diagram describing the processes of the adaptation of transformation from a first clock reference model 806 to a second clock reference model 808, in accordance with one embodiment. The processes of the flow diagram in FIG. 9, are described with reference to the linear model illustrated in FIG. 8.

In process block 902, a set of parameters ($a_0$,$b_0$) are initialized to a set of values at $t_i$, used to generate a clock reference model 806. In process block 904, a subsequent synchronization point $t_j$ 804 becomes available as a time of update 812. In process block 906, an updated second model clock reference 808 is generated with parameters ($a_2$,$b_2$). In process block 908, to provide a continuous monotonic transformation of time, transitional model parameters ($a_1$,$b_1$) 814 are calculated for generating a transitional clock reference model 810, for moving from the first clock reference model 806 to the second clock reference model 808 between times $t_s$ and $t_f$. In one embodiment, $t_s$ and $t_f$ are chosen to be sufficient to compensate for processing delays and some other timing considerations.

Alternate Embodiments

Several aspects of one implementation of the multimedia data synchronization for providing distributed array signal processing have been described. However, various implementations of the multimedia data synchronization provide numerous features including, complementing, supplementing, and/or replacing the features described above. Features can be implemented as part of a stand alone PC or as part of a distributed multimedia capture system in different embodiment implementations. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

In addition, although an embodiment described herein is directed to a distributed multimedia capture system, it will be appreciated by those skilled in the art that the embodiments of the present invention can be applied to other systems. In fact, systems for multimedia synchronization fall within the embodiments of the present invention, as defined by the appended claims. The embodiments described above were chosen and described in order to best explain the principles of the embodiments of the invention and its practical applications. These embodiments were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A method comprising:
   capturing, via a plurality of multimedia platforms, multimedia data;
   receiving, during capture of the multimedia data, a first synchronization signal by each of the plurality of multimedia platforms;
   processing, by each multimedia platform, the first synchronization signal to generate a first common clock reference among the plurality of multimedia platforms;
   synchronizing captured multimedia data according to the first common clock reference;
   receiving, a second synchronization signal by each of the plurality of multimedia platforms;
   processing, by each multimedia platform, the second synchronization signal to generate a transitional common clock reference among the plurality of multimedia platforms; and
   processing, by each multimedia platform, the second synchronization signal to generate a second common clock reference among the plurality of multimedia platforms.

2. The method of claim 1, wherein the transitional common clock reference provides a continuous monotonic transformation between the first common clock reference and the second common clock reference.

3. The method of claim 2, further including: synchronizing captured multimedia data according to the second common clock reference.

4. The method of claim 3, further including generating the first, the transitional, and the second common clock reference in a sequence of time periods.

5. The method of claim 4, wherein generating the first, the transitional, and the second common clock references include generating the common clock references by performing a sample time conversion on the respective synchronization signals.

6. The method of claim 5, wherein the sample time conversion includes a linear model of $y(t)=at+b$ with a and b being constants, t representing a sample clock period on one of the multimedia platforms, and y representing a clock period of a clock on a unit that generated the first and second synchronization signals.

7. A machine-readable storage medium having stored thereon a set of instructions which when executed cause a system to perform a method comprising of:
   capturing, via a plurality of multimedia platforms, multimedia data;
   receiving, during capture of the multimedia data, a first synchronization signal by each of the plurality of multimedia platforms;
   processing, by each multimedia platform, the first synchronization signal to generate a first common clock reference among the plurality of multimedia platforms;
   synchronizing captured multimedia data according to the first common clock reference;
   receiving, a second synchronization signal by each of the plurality of multimedia platforms;
   processing, by each multimedia platform, the second synchronization signal to generate a transitional common clock reference among the plurality of multimedia platforms; and
   processing, by each multimedia platform, the second synchronization signal to generate a second common clock reference among the plurality of multimedia platforms.

8. The machine-readable storage medium of claim 7, wherein the transitional common clock reference provides a continuous monotonic transformation between the first common clock reference and the second common clock reference.

9. The machine-readable storage medium of claim 8, further including: synchronizing captured multimedia data according to the second common clock reference.

10. The machine-readable storage medium of claim 9, further including generating the first, the transitional, and the second common clock references in a sequence of time periods.

11. The machine-readable storage medium of claim 10, wherein generating the first, the transitional, and the second common clock references include generating the common clock references by performing a sample time conversion on the respective synchronization signals.

12. The machine-readable storage medium of claim 11, wherein the sample time conversion includes a linear model of $y(t)=at+b$, with a and b being constants, t representing a sample clock period on one of the multimedia platforms, and y representing a clock period of a clock on a unit that generated the first and second synchronization signals.

13. A system comprising:
   a processor;
   a network interface coupled to the processor; and
   a machine readable storage medium having stored thereon a set of instructions which when executed cause the system to perform a method comprising of: capturing, via a plurality of multimedia platforms, multimedia data;
   receiving, during capture of the multimedia data, a first synchronization signal by each of the plurality of multimedia platforms;
   processing, by each multimedia platform, the first synchronization signal to generate a first common clock reference among the plurality of multimedia platforms;
   synchronizing captured multimedia data according to the first common clock reference;
   receiving, a second synchronization signal by each of the plurality of multimedia platforms;
   processing, by each multimedia platform, the second synchronization signal to generate a transitional common clock reference among the plurality of multimedia platforms; and
   processing, by each multimedia platform, the second synchronization signal to generate a second common clock reference among the plurality of multimedia platforms.

14. The system of claim 13, wherein the transitional common clock reference provides a continuous monotonic transformation between the first common clock reference and the second common clock reference.

15. The system of claim 14, further including synchronizing captured multimedia data according to the second common clock reference.

16. The system of claim 15, further including generating the first, transitional, and second common clock references in a sequence of time periods.

17. The system of claim 16, wherein generating the first, the transitional, and the second common clock references include generating the common clock references by performing a sample time conversion on the respective synchronization signals.

18. The system of claim 17, wherein the sample time conversion includes a linear model of $y(t)=at+b$ with a and b being constants, t representing a sample clock period on one of the multimedia platforms, and y representing a clock period of a clock on a unit that generated the first and second synchronization signals.

* * * * *

UNITED STATES PATENT AND TRADEMARK OFFICE
CERTIFICATE OF CORRECTION

PATENT NO. : 7,266,713 B2 Page 1 of 1
APPLICATION NO. : 10/754977
DATED : September 4, 2007
INVENTOR(S) : Lienhart et al.

It is certified that error appears in the above-identified patent and that said Letters Patent is hereby corrected as shown below:

In column 9, at line 3, delete "sampling," and insert --representing the sampling--.

Signed and Sealed this

Twentieth Day of May, 2008

JON W. DUDAS
*Director of the United States Patent and Trademark Office*